** 3,046,237
BLEND COMPRISING PLASTICIZED VINYL CHLO-
RIDE RESIN AND A MONOOLEFINIC POLYMER
AND PROCESS OF PREPARING SAME
William J. Rosenfelder and Jacob J. Rosen, New York,
N.Y., assignors to Dublon, Inc., Newark, N.J., a corpo-
ration of New Jersey
No Drawing. Filed Dec. 12, 1961, Ser. No. 158,879
15 Claims. (Cl. 260—23)

This invention relates to novel resin compositions.

Polyethylene and vinyl chloride resins are normally considered to be incompatible. It has been proposed in Land Patent 2,737,502 to add small amounts (2 to 10%) of a copolymer of vinyl chloride and octylacrylate to polyethylene to relieve stress cracking. This specific vinyl chloride octylacrylate copolymer apparently is effective because the copolymerization with octyl acrylate renders the vinyl chloride copolymer compatible with polyethylene, contrary to the usual incompatibility. The use of octyl acrylate as a copolymerizing material to improve the processibility of vinyl chloride resins is well known.

It has also been proposed in Schule Canadian Patent 571,090 to employ small amounts of certain specific polyethtylenes to lubricate vinyl chloride resins. Schule shows up to 5 parts of polyethylene per 100 parts of vinyl chloride. He further points out that polyethylenes have low compatibility with resins in general and that only small amounts of polyethylene can be employed to lubricate his vinyl chloride resins.

Scrap polyvinyl chloride has a relatively low resale value since there are not too many places where it can be employed.

It is an object of the present invention to prepare new compositions which contain predominantly polyethylene or polypropylene.

Another object is to develop a use for scrap polyvinyl chloride.

A further object is to prepare cheaper polyethylene compositions.

Yet another object is to prepare mixtures of polyethylene and vinyl chloride resins which have a lower specific gravity than would be expected from simply mixing the two resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by mixing 95–50% of polyethylene or polypropylene with 5–50% of plasticized polyvinyl chloride or certain plasticized vinyl chloride copolymers as defined hereinafter. If too much vinyl chloride resin is employed the product becomes weaker and too soft for many uses.

In the present specification and claims it should be noted that all parts and percentages are by weight unless otherwise noted.

While as above indicated there can be used as little as 5 or 10% of the plasticized vinyl chloride resin, preferably there is employed 20, 30 or 40% of the plasticized vinyl chloride resin and for some uses as much as 50% can be employed based on the total of the polyethylene and plasticized vinyl chloride polymer.

Scrap plasticized vinyl chloride resin, e.g. plasticized polyvinyl chloride left over as flashing or rejects in blow molding, injection molding, extrusion molding or the like can be employed satisfactorily in the present invention although there can also be employed virgin plasticized vinyl chloride resins.

Surprisingly it has been found that when the polyethylene and plasticized vinyl chloride polymer are blended that the resultant composition has a specific gravity considerably lower than would be expected. Thus when mixing 75% of polyethylene of specific gravity 0.950 with 25% plasticized polyvinyl chloride of specific gravity 1.252 the blended product has a specific gravity of 1.003 in place of the expected specific gravity of 1.025. Thus there accrue the advantages attendant upon the use of a lighter weight material.

According to the invention there is employed a solid polymer of an olefin having 2 to 3 carbon atoms, i.e. polyethylene, polypropylene and copolymers of polyethylene with polypropylene (e.g. a 50–50 copolymer on a molecular basis).

There can be employed any of the commercially available polyethylenes e.g. of high density (0.941–0.965) medium density (0.926–0.940) and low density (9.910–0.925) and commercially available polypropylenes, e.g. of density 0.90–0.91. The polyethylene or polypropylene can be made by any of the conventional procedures such as with Ziegler catalysts or Phillips catalysts; the polyethylene can be made by high or low pressure.

While it is preferred to employ polyvinyl chloride, i.e. a homopolymer, there can be utilized copolymers of vinyl chloride with certain other ethylenically unsaturated monomers in which a predominant proportion, i.e., more than 50% of the copolymer is vinyl chloride. Thus there can be used copolymers of vinyl chloride with less than 50% of a vinyl ester of a saturated fatty acid having up to 4 carbon atoms, e.g. vinyl acetate, vinyl propionate and vinyl butyrate, vinylidene chloride, acrylonitrile, ethylenically unsaturated aromatic hydrocarbon, e.g. styrene, vinyl lower alkyl ethers, e.g. vinyl ethyl ether and vinyl butyl ether, lower alkyl maleates and fumarates, e.g. diethyl maleate, diethyl fumarate and dibutyl maleate, vinylidene chloride and maleic anhydride. Specific examples of suitable copolymers include vinyl chloride 91%—vinyl acetate 9%, vinyl chloride 86%—vinyl acetate 13%—maleic anhydride 1%, vinylchloride 62%—vinyl acetate 38%, vinyl chloride 80%—vinylidene chloride 20%, vinyl chloride 95%—vinylidene chloride 5%, vinyl chloride 90%—diethyl fumarate 10%, vinyl chloride 80%—diethyl maleate 20%, vinyl chloride 80%—dimethyl maleate 20%, vinyl chloride 80%—acrylonitrile 20%, vinyl chloride 60%—acrylonitrile 40%, vinyl chloride 76%—vinyl isobutyl ether 24%.

As has previously been set forth it is essential that the vinyl chloride polymer be plasticized. The plasticizer is used in conventional amount, e.g. 10 to 100 parts for each 100 parts by weight of the vinyl chloride containing resin. Preferably 35 to 60 parts of plasticizer are employed per 100 parts of resin. Any of the conventional plasticizers for vinyl chloride resins can be employed. Thus there can be used phthalates, e.g. di-n-octyl phthalate, dibutyl phthalate, butyl octyl phthalate, butyl decyl phthalate, dioctyl isophthalate, diisooctyl phthalate, di-2-ethylhexyl phthalate, diisodecyl phthaltae, ditridecyl phthalate, octyl decyl phythalate, diphenyl phthalate, di-(isodecyl) 4,5-epoxy tetrahydrophthalate, dimethoxyethyl phthalate, dibutoxyethyl phthalate; phosphates, e.g., tri-2-ethylhexyl phosphate, tricresyl phosphate, triphenyl phosphate, octyl diphenyl phosphate, dodecyl dicresylphosphate; adipates, e.g., dibutyl adipate, dihexyl adipate, dicapryl adipate, diisooctyl adipate, diisodecyl adipate, dibutoxyethyl adipate; azealates, e.g., di-2-ethylbutyl azelate; benzoates, e.g., triethyl glycol dibenzoate; chlorinated diphenyl; citrates, e.g., tributyl acetyl citrate, triethyl citrate, tri n-butyl citrate, acetyl triethyl citrate, acetyl tri (2-ethylhexyl) citrate; epoxy plasticizers, e.g., alkyl epoxy stearates such as octyl epoxy stearate, epoxidized soy bean oil, octyl epoxy tallate, dibutyl fumarate; alkyl phthalyl alkyl glycolates, e.g., methyl phthalyl ethyl glycolate, ethyl phthalyl ethyl glycolate, butyl phthalyl butyl glycolate; hydrocarbons, e.g., hydrogenated terphenyl, and dodecyl benzene; laurates, e.g., butyl laurate, propylene glycol monolaurate, glycerol monolaurate, polyethylene glycol 400 dilaurate; chlorinated paraffins, polyesters; sebacates, e.g., dioctyl sebacate, dimethyl sebacate and dibutyl sebacate.

The presently preferred plasticizer is dioctyl phthalate (DOP).

The plasticized vinyl chloride resin also can have known additives therein. Thus there can be added per 100 parts of vinyl chloride resin 0.1–10 parts, usually 2–5 parts of a stabilizer such as diethylene glycol di 1,3-butylene diphosphite, diethylene glycol dineopentylene diphosphite, triethylene glycol dineopentylene diphosphite, diethylene glycol dihexylene diphosphite, and similar heterocyclic diphosphites disclosed in Rosenfelder et al. Application 56,128 filed September 15, 1960 and alkyl and aryl phosphites such as triphenyl phosphite, tridecyl phosphite, decyl diphenyl phosphite, tricresyl phosphite, di (p-tert. butylphenyl) phenyl phosphite, trioctyl phosphite and tribenzyl phosphite. Other suitable stabilizers include barium, strontium, calcium, cadmium, zinc, lead, tin and magnesium, salts of phenols, aromatic carboxylic acids, fatty acids, and epoxy fatty acids. Examples of such salts include barium di (nonylphenolate), strontium di (nonylphenolate), strontium di (amylphenolate), barium di (octylphenolate), strontium di (octylphenolate), calcium di (octylphenolate), cadmium di (octylphenolate), barium di (hexylphenolate), lead di (octylphenolate), magnesium di (octylphenolate), cadmium 2-ethyl hexoate, cadmium laurate, cadmium stearate, zinc caprylate, cadmium caproate, barium stearate, barium 2-ethyl hexoate, barium laurate, barium ricinoleate, lead stearate, aluminum stearate, magnesium stearate, calcium stearate, cadmium naphthenate, phenoxy lead stearate, nonylphenoxy lead stearate, cadmium benzoate, cadmium p-tert. butylbenzoate, stannous 2-methyl-4-isopropylbenzoate, lead octyl salicylate, calcium octyl salicylate, cadmium epoxy stearate, strontium epoxy stearate, cadmium salt of epoxidized soybean oil acids. It is conventional to employ mixtures of such stabilizers with vinyl chloride resins and mixtures of such stabilizers can be employed in the plasticized vinyl chloride resins of the present invention. In plastisol formulations there is generally included an epoxy fatty oil, e.g. epoxidized soybean oil or epoxidized tall oil ester as a portion of the stabilizer.

When utilizing scrap plasticized vinyl chloride resins the resin will normally include the stabilizer and no more need be added. However, for improved stability it is sometimes desirable to add a small amount of additional stabilizer, e.g. 1–5 parts per 100 parts of vinyl chloride resin.

There can also be added small amounts of conventional dyes, pigments and fillers.

The polyethylene or polypropylene can be blended with the plasticized vinyl chloride resin utilizing conventional equipment, e.g. by extrusion, milling or by banburying. The blending can be carried out at 350–500° F., for example. In the following polyethylene examples there was used a Waldron-Hartig extruder having a length to depth ratio of 20:1. The extruder was operated at a temperautre of about 450° F.

The products of the present invention can be used in conventional molding operations such as blow molding, vacuum molding, injection molding or the like to produce numerous types of articles, e.g. dolls, bottles, bottle cap liners and the like.

*Example 1*

25 parts of flesh colored scrap polyvinyl chloride plasticized with dioctyl phthalate and having a density of 1.252 was ground with 75 parts of polyethylene having a density of 0.950 and then extruded. The extruded product had a density of 1.003. There was about 40 parts of dioctyl phthalate per 100 parts of polyvinyl chloride in the scrap.

*Example 2*

Example 1 was repeated using 20 parts of scrap polyvinyl chloride density 1.2904 and 80 parts of polyethylene density 0.9573. The extruded product had a density of 1.0059. Based on the amount of scrap polyvinyl chloride the expected density is 1.0239.

*Example 3*

The procedure of Example 1 was repeated but 2 parts of barium cadmium laurate per 100 parts of scrap polyvinyl chloride were added prior to extrusion to obtain a product having improved stability.

*Example 4*

The procedure of Example 1 was repeated utilizing 80 parts of polypropylene (Shell) density 0.9056 with 20 parts of the scrap polyvinyl chloride density 1.2884 to obtain an extruded product having a density of 0.9620. The expected density according to theory is 0.9821.

*Example 5*

30 parts of virgin plasticized polyvinyl chloride (Geon 121) were mixed with 70 parts of polyethylene (Alathon 14, molecular weight about 20,000, density 0.916) and then extruded in the manner described above.

The virgin plasticized polyvinyl chloride employed was a plastisol of the following formulation:

| | Parts |
|---|---|
| Polyvinyl chloride | 100 |
| Dioctyl phthalate | 55 |
| Epoxidized tall oil ester | 5 |
| Calcium carbonate | 10 |
| Diethylene glycol di neopentylene diphosphite | 2 |
| Mixture of 52% barium octyl phenolate, 40% cadmium octoate and 8% diethylene glycol dineopentylene diphosphite | 3 |

*Example 6*

40 parts of virgin plasticized polyvinyl chloride resin (Geon 101) were mixed with 60 parts of polyethylene density 0.950 and then extruded in the manner described above.

The virgin plasticized polyvinyl chloride employed had the following formulation:

| | Parts |
|---|---|
| Polyvinyl chloride | 100 |
| Dioctyl phthalate | 30 |
| Tricresyl phosphate | 6 |
| Epoxidized soybean oil | 3 |
| Dodecyl benzene | 5 |
| Mixture of 52% barium octyl phenolate, 40% cadmium octate and 8% diethylene glycol di 1,3-butylene phosphite | 4 |

Similar results but somewhat inferior stability was obtained by the use of a similar formulation in which the diethylene glycol di 1,3-butylene phosphite was replaced by triphenyl phosphite.

The products of the present invention are uniform blends. When unplasticized polyvinyl chloride is employed there is incompatibility.

*Example 7*

The procedure of Example 1 was repeated utilizing 20 parts of scrap polyvinyl chloride, density 1.2904 and 80 parts of polyethylene, density 0.9167. The product had a density of 0.9705. The theoretical expected density is 0.9914.

*Example 8*

The procedure of Example 1 was repeated utilizing 20 parts of virgin plasticized polyvinyl chloride (Geon 121) density 1.2152 and 80 parts of polyethylene, density 0.9573. The density of the product was 1.006. The expected density was 1.009.

The plasticized polyvinyl chloride was made from 100 parts of polyvinyl chloride and 60 parts of epoxidized soybean oil.

When vinyl chloride resin plastisol formulations are employed they can be admixed with the polyethylene or polypropylene either before or after curing the plastisol.

We claim:

1. A uniform blend of (*a*) 5–50% plasticized vinyl chloride resin selected from the group consisting of polyvinyl chloride and copolymers of vinyl chloride with minor amounts of at least one copolymerizable material of the group consisting of vinyl esters of a saturated fatty acid having up to 4 carbon atoms, vinylidene chloride, acrylonitrile styrene, lower alkyl maleates and fumarates having 1 to 4 carbon atoms in the alkyl groups and maleic anhydride with (*b*) 95–50% of a polymer of a monoolefin having 2 to 3 carbon atoms, there being 10–100 parts of plasticizer per 100 parts of vinyl chloride resin.

2. A blend according to claim 1 wherein there is used 20–40% of plasticized vinyl chloride resin and 80–60% of said monoolefin polymer.

3. A blend according to claim 1 wherein said monoolefin polymer is polyethylene.

4. A blend according to claim 1 wherein there are used 35–50 parts of plasticizer per 100 parts of vinyl chloride resin.

5. A blend according to claim 1 wherein said vinyl chloride resin is polyvinyl chloride.

6. A blend according to claim 5 wherein there are used 35–60 parts of plasticizer per 100 parts of vinyl chloride resin.

7. A blend according to claim 6 wherein there is used 20–40% of plasticized polyvinyl chloride and 80–60% of said monoolefin polymer.

8. A uniform blend of 5–50% of plasticized polyvinyl chloride and 95–50% of polyethylene, there being employed 10–100 parts of plasticizer per 100 parts of polyvinyl chloride.

9. A blend according to claim 8 wherein there is used 20–40% of the plasticized polyvinyl chloride and 80–60% of polyethylene.

10. A blend according to claim 8 wherein there is used 35–60 parts of plasticizer per 100 parts of polyvinyl chloride.

11. A blend according to claim 10 wherein there is used 20–40% of the plasticized polyvinyl chloride and 80–60% of the polyethylene.

12. A uniform blend of 20–30% of plasticized polyvinyl chloride containing 10–100 parts of plasticizer per 100 parts of polyvinyl chloride and 80–70% of polyethylene.

13. A process which comprises uniformly mixing 5–50% of polyvinyl chloride containing 10–100 parts of plasticizer per 100 parts of polyvinyl chloride with 95–50% of a polymer of a monoolefin having 2 to 3 carbon atoms.

14. A process according to claim 13 wherein the polymer of a monoolefin is polyethylene.

15. A blend according to claim 1 wherein said monoolefin polymer is polypropylene.

References Cited in the file of this patent

UNITED STATES PATENTS

| | | |
|---|---|---|
| 2,472,680 | Pratt | June 7, 1949 |
| 2,628,208 | Loukomsky | Feb. 10, 1953 |
| 2,689,197 | Gerlich | Sept. 14, 1954 |

FOREIGN PATENTS

| | | |
|---|---|---|
| 568,479 | Canada | Jan. 6, 1959 |
| 571,090 | Canada | Feb. 24, 1959 |
| 595,177 | Canada | Mar. 29, 1960 |

OTHER REFERENCES

"Low Molecular Weight Polyethylene Resins Open New Fields of Application," Plastics, December 1948, pages 12 and 29.